United States Patent [19]

Schrader et al.

[11] Patent Number: 4,929,020
[45] Date of Patent: May 29, 1990

[54] STRUT FOR A FOLDING VEHICLE COVER

[75] Inventors: Jürgen Schrader, Stuttgart; Klaus Claar, Sindelfingen, both of Fed. Rep. of Germany

[73] Assignee: Daimler-Benz AG, Fed. Rep. of Germany

[21] Appl. No.: 254,806

[22] Filed: Oct. 7, 1988

[30] Foreign Application Priority Data

Oct. 7, 1987 [DE] Fed. Rep. of Germany ....... 3733842

[51] Int. Cl.$^5$ .............................................. B60J 7/12
[52] U.S. Cl. ..................................... 296/118; 296/116
[58] Field of Search ............... 296/107, 116, 117, 118, 296/108

[56] References Cited

U.S. PATENT DOCUMENTS

| | | | |
|---|---|---|---|
| 3,323,830 | 6/1967 | Husko et al. | 296/116 |
| 3,994,524 | 11/1976 | Lehmann | 296/107 |
| 4,487,447 | 12/1984 | Schröder | 296/111 X |
| 4,708,389 | 11/1987 | Maebayashi et al. | 296/107 |
| 4,712,828 | 12/1987 | Albrecht | 296/107 X |

FOREIGN PATENT DOCUMENTS 836677 6/1960 United Kingdom .

Primary Examiner—Charles A. Marmor
Assistant Examiner—Michael Mar
Attorney, Agent, or Firm—Evenson, Wands, Edwards, Lenahan & McKeown

[57] ABSTRACT

The invention relates to a strut for a folding vehicle cover which bridges the roof width by being braced axially on load bearing connecting components on both sides of the vehicle by angled strut flanks, while a strut section driven by a spring loading arrangement is raisable in the strut plane relative to the braced ends of the strut flanks into a tensioned position in which the roof skin of the folding cover is stressed by the spring loading arrangement through the strut section, and while a further vertical displacement of the strut section is locked upon reaching a limit time position located above the tensioned position. To facilitate the operation of the strut, it is provided that the strut is integrated into the cover frame of the folding cover by its strut flanks being braced articulately against associated side wall frame parts, that the strut section is retained in the locked limit position during the course of the closing movement of the folding cover until a taut roof skin is obtained, and that in a final closing phase of the folding cover it is automatically lowerable out of its limit position counter to the spring loading arrangement into its tensioned position under the influence of longitudinal tensile forces in the roof skin.

5 Claims, 1 Drawing Sheet

4,929,020

STRUT FOR A FOLDING VEHICLE COVER

BACKGROUND & SUMMARY OF THE INVENTION

The invention relates to a strut for a folding vehicle cover of the type which bridges the roof width by being braced axially by angled strut flanks attached to load-bearing connecting components on both sides of the vehicle, a strut section of the strut being raisable into a tensioned position in which the roof skin of the folding cover is stressed by a spring loading means formed by the strut section.

A strut of this type is disclosed in British Patent Specification No. 836,677. This is a tubular corner strut having strut flanks angled downwards in mutual mirror image symmetry, which can be plugged into housing bushes fixed to the vehicle wall in order to attach the strut to the vehicle. The lower ends of the strut flanks are thereby firmly braced circumferentially and counter to the plug-in direction after the strut is fitted.

In order to achieve a vertical mobility of an upper strut section, the strut flanks are divided into a plurality of tubular sections which are nested telescopically and which therefore permit variations in the length of the strut flanks by mutual longitudinal sliding of the mutually associated tubular sections.

Since the corner strut is required to tension the roof skin of an associated folding cover, a compression spring arrangement is provided which stresses the yoke-shaped upper strut section with a vertical feed and presses it against the roof skin with a substantially constant spring force.

The total possible vertical feed of the strut section is limited here by slot stops of the telescopic guides, each of which is formed by a clamp screw.

By means of the clamp screws the strut section can be fixed simultaneously in a lower limit position, whereby the closing process of the folding cover remains possible without difficulty when the corner strut is applied.

When the folding cover is closed the clamp screws may be released, causing the strut section, driven by the compression springs, to fly up until no further vertical feed is possible after the roof skin is made taut.

The fitting of the known corner strut is thus necessary in addition to the closing process of the folding cover and is furthermore rendered difficult by complicated operation.

It is therefore an underlying object of the invention to develop a generic strut of a folding vehicle cover further so that its operation is simplified as far as possible.

This object is achieved according to the invention by providing an arrangement wherein the strut is integrated into the cover frame of the folding cover by its strut flanks being braced articulately against associated side wall frame parts, wherein the strut section is retained in the locked limit position during the course of the closing movement of the folding cover until a taut roof skin is obtained, and wherein in a final closing phase of the folding cover it is automatically lowerable out of its limit position counter to the spring bras of the spring loading means into a tensioned position under the influence of longitudinal tensile forces in the roof skin. With this arrangement the strut participates in the positive movement of the cover frame and is entrained by the cover fabric into its obliquely oriented limit position when the folding cover is closed. The transmission of the lowering feed to the strut section demands higher actuating forces in the final closing phase compared to customary folding covers, whereas the manipulation of the folding cover remains entirely unmodified.

An operation of the strut independent of the operation of the folding cover is therefore superfluous.

The strut can be constructed particularly simply if it is constructed overall as a flexurally resilient shaped spring, whilst the locked limit position and also the tensioned position of the strut section may be defined by different deformation positions.

This construction is characterized by a small material outlay, the possibility of inexpensive production, low fault-proneness and minimum requirements for installation space.

Other objects, advantages and novel features of the present invention will become apparent from the following detailed description of the invention when considered in conjunction with the accompanying drawings.

DETAILED DESCRIPTION OF THE DRAWINGS

Figure 1:
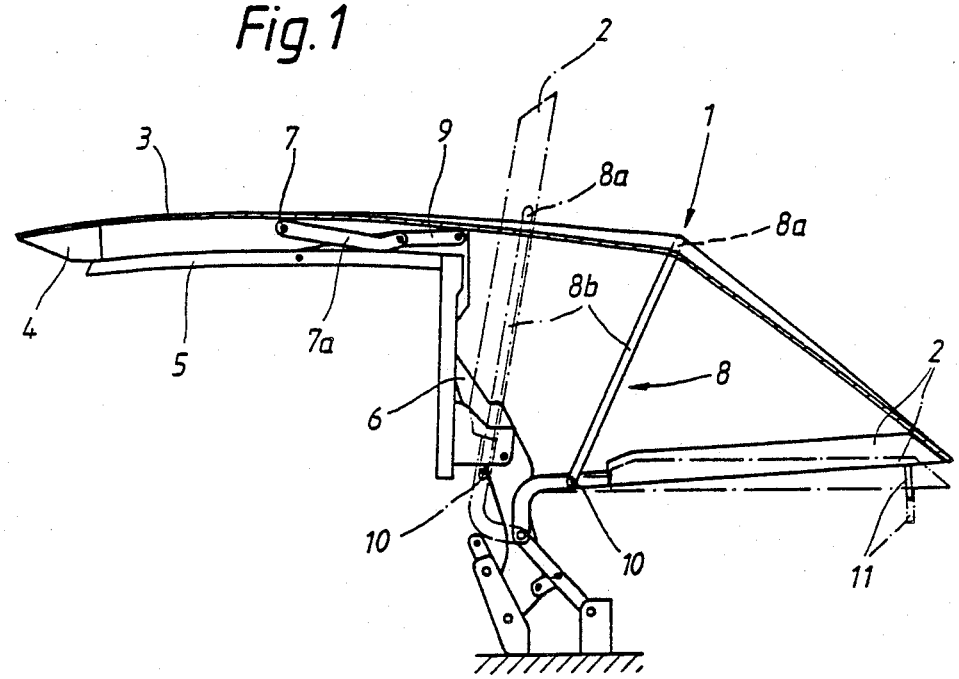
FIG. 1 shows a side view of a cover frame of a folding cover for a vehicle convertible top constructed in accordance with a preferred embodiment of the invention.

A folding cover 1 of a cabriolet, not shown in detail, is an embodiment which is completely lowerable into a U-shaped cover box enclosing the rear seat region of the vehicle. The following copending commonly assigned U.S. patent applications disclose further features of this general type of folding convex cabriolet arrangement (i) Ser. No. 223,367 filed on July 25, 1988 and (ii) Ser. No. 223,368 filed on July 25, 1988.

The solid line showing of folding cover 1 occupies an almost completely closed position in which a U-shaped roof skin retaining yoke 2, which forms a lower extremity of the folding cover 1, has not yet assumed its position of rest on a cover box lid which closes the cover box towards the top.

A roof skin 3, which forms an external portion of the folding cover 1 facing outwards and consists of textile material, is sectioned in the drawing in the side wall plane so that the main parts of the cover frame between which the roof skin 3 is tensioned, are visible.

The cover frame includes a front roof frame 4, which maintains the roof skin 3 adjacently to a top frame of a windscreen, two lateral roof frames 5, to which the roof skin 3 is connected above the side windows of the cabriolet, the two uprights 6 of a main strut, on which the roof skin 3 is retained adjacently to the rear window edges of the side windows, and the roof skin retaining yoke 2 already mentioned, by which the roof skin 3 is enclosed all around in the region of its rear extremity. An intermediate strut 7 and a corner strut 8 are also provided for the intermediate bracing of the roof skin 3. The intermediate supports 7 struts the interior surface of the roof skin 3 by a strut tube which bridges the roof width and is articulated pivotably to lateral roof frame guide rods 9 by flanks 7a directed backwards at right angle, the flanks 7a being constructed as leaf springs. A pivot stop, not shown, is arranged between each of the flanks 7a and the associated roof frame guide rod 9. These pivot stops ensure that the intermediate strut 7 is blocked so that the strut 7 cannot be pivoted closer to the roof side frames 5 than the position illustrated under the influence of tensile forces in the roof skin 3. The flanks 7a are of soft flexural construction only in the transverse direction of the vehicle and nevertheless brace the strut tube upwards with high flexural rigidity.

Figure 2:
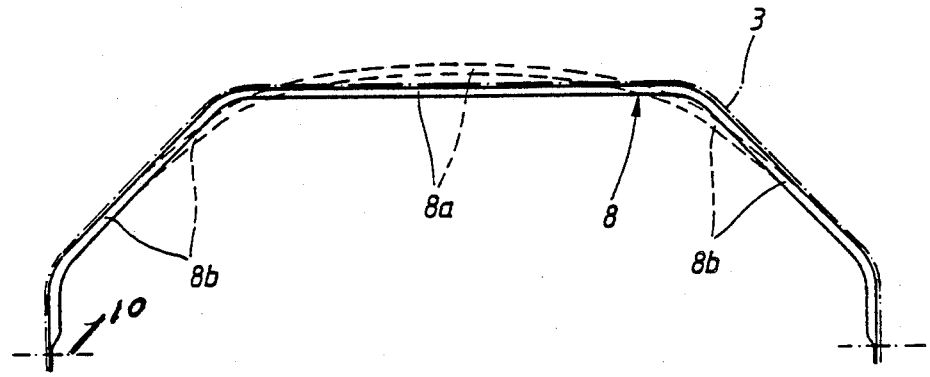
FIG. 2 shows a diagrammatic rear view of a corner strut of the cover frame according to FIG. 1 in respective overarched and flattened positions.

The corner stop 8 comprises of a resilient tubular yoke which had generally a somewhat trapezoidal outline. Thus, the corner strut 8 includes a struction section 8a oriented approximately horizontally in the central region and obliquely oriented strut flanks 8b, shaped onto the strut section 8a in mirror image relationship, by which the corner strut 8 is mounted pivotably at ends thereof on the associated lateral members of the roof skin retaining yoke 2. Since a lower longitudinal section of the strut flanks 8b is required to tension the roof skin 3 in the side wall plane thereof, these longitudinal sections are bent out of the oblique directionary extension of strut flanks 8b into the side wall plane of the folding cover 1 for attachment to pivot bearings 10 as seen in FIG. 2;. Due to this extension of the strut flanks 8b the geometrical axis of the pivot bearings 10 on the roof skin retaining yoke 2 about which the strut 8 is pivoted can extend horizontally in the transverse direction of the vehicle, which is convenient for the folding process of the corner strut 8.

In order to make the strut section 8a flexible downwards by the influence of longitudinal tensile forces in the roof skin 3 in the course of the closing process, the strut section 8a has a convexly curved shape when the roof skin 3 is tensioned only in the direction of the transverse plane of the corner strut 8. To cause the strut section 8a to assume this overarched shape, the corner strut 8, which is generally constructed as a shaped spring, is pretensioned in the width direction of the folding cover 1, while the spring forces of the folding cover 1, which have a tendency to force apart the lower end regions of the strut flanks 8b in the sense of an increase in interval, are absorbed through the pivot bearings 10 by the roof skin retaining yoke 2, which is rigid in upward flexure. The overarching of the strut section 8a is then accompanied by a slight springing of the obliquely oriented longitudinal sections of the strut flanks 8b. It is also contemplated, as an alternative, to make the corner strut 8 with an overarched strut section 8a, which would reduce the axial stressing of the pivot bearing 10. The tubular cross-section of the corner strut 8 could also be replaced by a leaf spring cross-section for example. Moreover, it would be conceivable according to certain embodiments of the invention to vary the profile cross-section of the corner strut 8 along its length so that the required deformation behavior is again adjusted overall. The over limits to the freedom of structural conformation are imposed here by the spring force to be exerted ultimately, which must be dimensioned to maintain the roof skin 3 taut reliably under all customary travelling conditions.

The tautning of the roof skin 3 during closing of the folding cover 1 occurs in two consecutive stages by the backward folding movement of the roof skin retaining yoke 2. The tensioning process can occur after the front roof frame 4 is connected firmly by locks to the associated window frame of the vehicle body. This presupposes that the uprights 6 of the main strut occupy the erect position shown, and that the intermediate strut 7 is blocked pivotally by the roof frame guide rods 9. Thus all the frame parts arranged in front of the main strut are held stationary and can only be minimally resiliently deformed by tensile stresses in the roof skin 3.

In this tensioning process the roof skin retaining yoke 2 occupies its erect position indicated by broken lines in FIG. 1, whilst the strut 8 is likewise still located in a plane therefor of the erect retaining yoke 2. The roof skin 3 therefore makes large folds in the region of the upright 6. After the cover box lid is closed the roof skin retaining yoke 2 can be pivoted out of its erect position about a transverse vehicle axis oriented behind the cover uprights 6, whilst the roof skin 3 becomes increasingly taut. Just before the roof skin retaining yoke 2 reaches its rest position on the cover box lid as indicated by the solid lines of FIG. 1, a fully taut roof skin 3 is already present, whereby the first tensioning stage is complete. The corner strut 8, which is entrained by the tautning roof skin 3, also occupies its obliquely oriented limit position folded out of the plane of the roof skin retaining yoke 2 as indicated by the solid lines of FIG. 1, in which it is locked against any further pivoting about the pivot bearings 10. This locking is achieved by a traction web which is drawn taut and provided in a manner not shown between the strut tube of the main strut and the strut section 8a.

Since the elasticity of the roof skin 3 is very limited due to the relatively heavy quality of cloth of the cover fabrics which is necessary in order to achieve satisfactory robustness, when the strut section 8a occupies the overarched limit position illustrated by the dashed lines of FIG. 2, the roof skin 3 resists, when pressing the roof skin retaining yoke 2 down into its position of rest indicated by broken lines in FIG. 1. However, pressing the roof skin retaining yoke 2 down generates longitudinal tensile forces in the roof skin 3 which are transmitted to the strut section 8a and stress the latter in flexure. Since the longitudinal tensile forces securing are primarily concentrated between the front roof frame 4 and the opposite width section of the roof skin retaining yoke 2, the strut section 8a can only react by an inward springing towards the lowering direction. The spring stroke of the strut section 8a and the increased tensioning of the roof skin 3 due to the residual pivoting stroke of the roof skin retaining yoke 2 in the second tensioning stage are then matched mutually, so that in the rest position of the roof skin retaining yoke 2 shown in solid lines in FIG. 1, the strut section 8a is bent into a flattened, virtually extended tensioned position as shown in solid lines on FIG. 2. Due to this springing movement of the strut section 8a, the oblique sections of the strut flanks 8b simultaneously become bent slightly apart, so that they are then inclined somewhat more steeply. During this change of shape of the corner strut 8 the circumferential length of the corner strut 8, which abuts the roof skin 3, is unchanged so that the tension of the roof skin 3 in the transverse plane of the strut is increased slightly but only indirectly, that is to say with the superimposition of the longitudinal tensile forces of the roof skin 3.

When the roof skin retaining yoke 2 has assumed its rest position, it is retained in that position by two locking bolts 11 provided on the roof skin retaining yoke, which engage into associated locks. Due to the relatively high actuating forces which are required in the second tensioning stage of the roof skin 3, it is advantageous in order to facilitate the operation if the locking bolts 11 snap into a pre-engaged position of the locks before this closing phase is reached and can then be moved into their limit position by means of a servomotor.

The corner strut 8 according to the invention permits the the tensioning of the roof skin 3 in a particularly simple manner of a constant spring force which leads to a highly constant roof skin tension under customary service conditions, and with which, assuming that the spring force is adequately dimensioned, flutter phenomena of the roof skin 3 can no longer occur even at high travelling speeds.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A strut for a folding vehicle cover movable between a stored position and a raised, closed position and having a roof skin and a vehicle cover frame, the folding vehicle cover bridging a roof width and comprising:
   a central strut section;
   a strut flank extending outwardly at an angle from each end of the central strut section, the central strut section and strut flanks being raisable in a strut plane relative to braced ends of the strut flanks between a stored position and a raised, locked position;
   spring loading means formed by the central strut section and at least a portion of the strut flanks and having a bowed, relaxes configuration and a stressed tensioned configuration for providing a taut roof skin when the folding vehicle cover is closed, such that when the strut in in the raised locked position, the spring loading means occupies an upper limit position while in the bowed relaxed configuration which is located above a lower tensioned position of the spring loading means while in the stressed tensioned configuration; and
   means for integrating the strut into the vehicle cover frame by articulately bracing the strut flanks against associated side wall frame parts of the vehicle cover frame,
   wherein in a final closing phase of the folding cover the spring loading means in automatically lowered out of the bowed, relaxed position counter to a spring biasing force of the roof skin into the stressed, tensioned position under the influence of longitudinal tensile forces in the roof skin resulting from a final closing movement of the folding cover form a partially closed position to a fully closed position.

2. Strut according to claim 1, wherein the strut is constructed overall as a shaped spring.

3. Strut according to claim 2, wherein a central region of the strut which spans the roof width of the vehicle is vertically movable as a strut section.

4. Strut according to claim 3, wherein the strut section is overarched upwards in its upper limit position and flattened with flexurally resilient springing in its tensioned position.

5. Strut according to claim 1, wherein a trapezoidally conformed corner strut is provided as the strut.

* * * * *